United States Patent
Arnold

(10) Patent No.: US 8,978,606 B2
(45) Date of Patent: Mar. 17, 2015

(54) DEVICE FOR VARIABLY ADJUSTING THE CONTROL TIMES OF GAS EXCHANGE VALVES OF AN INTERNAL COMBUSTION ENGINE

(75) Inventor: Mario Arnold, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 110 days.

(21) Appl. No.: 13/388,153

(22) PCT Filed: Dec. 8, 2009

(86) PCT No.: PCT/EP2009/066593
§ 371 (c)(1),
(2), (4) Date: Jan. 31, 2012

(87) PCT Pub. No.: WO2011/032610
PCT Pub. Date: Mar. 24, 2011

(65) Prior Publication Data
US 2012/0125275 A1  May 24, 2012

(30) Foreign Application Priority Data

Sep. 18, 2009 (DE) .......................... 10 2009 042 228

(51) Int. Cl.
*F01L 1/34* (2006.01)
*F01L 1/047* (2006.01)
(Continued)

(52) U.S. Cl.
CPC ................ *F01L 1/047* (2013.01); *F01L 1/344* (2013.01); *F01L 1/34* (2013.01); *F02D 13/0219* (2013.01);
(Continued)

(58) Field of Classification Search
CPC ............ F01L 1/3442; F01L 1/344; F01L 1/34; F01L 2001/34483; F02D 2041/001; F02D 13/0219; Y02T 10/18
USPC ............ 123/90.17, 90.15, 90.16, 90.12, 90.31
See application file for complete search history.

(56) References Cited

U.S. PATENT DOCUMENTS 5,234,088 A    8/1993  Hampton
5,337,711 A *  8/1994  Hampton .................... 123/90.17
(Continued)

FOREIGN PATENT DOCUMENTS

DE       19708661      6/2005
DE     102005024241   12/2006
(Continued)

*Primary Examiner* — Kenneth Bomberg
*Assistant Examiner* — Wesley Harris
(74) *Attorney, Agent, or Firm* — Volpe and Koenig, P.C.

(57) ABSTRACT

A device (11) for variably adjusting the control times of gas exchange valves (9, 10) of an internal combustion engine (1), including an input drive element (14), an output drive element (15), and at least one side cover (16), wherein the input drive element (14) can be brought into driven connection with a crankshaft (2) of the internal combustion engine (1), the output drive element (15) can be brought into driving connection with a camshaft (6, 7) of the internal combustion engine (1) and is pivotally mounted relative to the input drive element (14). The side cover (16) is mounted on an axial side surface of the output drive element (15) or of the input drive element (14) and is connected in a rotationally fixed manner to the input drive element (14) or the output drive element (15). A spring element (25) is mounted on the side of the side cover facing away from the input and output drive elements (14, 15), and the side cover (16) has a disk-shaped section (23), from which several fastening elements (24) protrude in the axial direction, the fastening elements being mounted on the side of the side cover (16) facing away from the input drive element (14).

6 Claims, 2 Drawing Sheets

(51) Int. Cl.
 F01L 1/344 (2006.01)
 F02D 13/02 (2006.01)
 F02D 41/00 (2006.01)

(52) U.S. Cl.
 CPC ......... F01L 1/3442 (2013.01); *F02D 2041/001* (2013.01); *Y02T 10/18* (2013.01); *F01L 2001/34483* (2013.01)
 USPC .................................. 123/90.17; 123/90.15

(56) References Cited

U.S. PATENT DOCUMENTS

| | | | |
|---|---|---|---|
| 6,684,834 B2 * | 2/2004 | Kohrs | 123/90.17 |
| 6,772,721 B1 * | 8/2004 | Gardner et al. | 123/90.17 |
| 7,252,059 B2 * | 8/2007 | Abbott et al. | 123/90.17 |
| 7,401,582 B2 * | 7/2008 | Pierik et al. | 123/90.17 |
| 2009/0211549 A1 | 8/2009 | Myers et al. | |
| 2009/0250028 A1 * | 10/2009 | Fujiyoshi et al. | 123/90.17 |
| 2010/0116233 A1 * | 5/2010 | Weisser et al. | 123/90.17 |

FOREIGN PATENT DOCUMENTS

| | | |
|---|---|---|
| DE | 102006036052 | 2/2008 |
| DE | 102007035671 | 1/2009 |
| DE | 102008017688 | 10/2009 |
| WO | 03085238 | 10/2003 |

* cited by examiner

DEVICE FOR VARIABLY ADJUSTING THE CONTROL TIMES OF GAS EXCHANGE VALVES OF AN INTERNAL COMBUSTION ENGINE

FIELD OF THE INVENTION

The invention relates to a device for variably adjusting the control times of gas-exchange valves of an internal combustion engine with a drive element, a driven element, and at least one side cover, wherein the drive element can be brought into driven connection with a crankshaft of the internal combustion engine and is arranged so that it can pivot relative to the driven element, wherein the side cover is arranged on an axial side surface of the driven element or of the drive element and is locked in rotation with the drive element or the driven element, wherein a spring element is arranged on the side of the side cover facing away from the drive element and the driven element, and wherein the side cover has a disk-shaped section from which several fastening elements project in the axial direction, with these fastening elements being arranged on the side of the side cover facing away from the drive element.

BACKGROUND

In modern internal combustion engines, devices for variably adjusting the control times of gas-exchanges valves are used in order to be able to variably adjust the phase relationship between the crankshaft and camshaft in a defined range of angles, between a maximum advanced position and a maximum retarded position. The device is integrated in a drive train by means of which torque is transferred from the crankshaft to the camshaft. This drive train can be realized, for example, as a belt, chain, or gear train. In addition, the device is locked in rotation with a camshaft and has one or more pressure chambers by means of which the phase relationship between the crankshaft and the camshaft can be changed in a targeted way.

Such a device is known, for example, from DE 10 2008 017 688 A1. The device has a drive element, a driven element, and two side covers, wherein the drive element is in driven connection with a crankshaft and the driven element is locked in rotation on a camshaft. Here, the driven element is arranged so that it can pivot relative to the drive element in a defined angular interval. The drive element, the driven element, and the side covers delimit multiple pressure chambers that can be variably adjusted between the driven element and the drive element. The side covers are arranged on the axial side surfaces of the driven element and of the drive element and are locked in rotation with the drive element by means of screws. Here, each of the screws penetrates the first side cover and the drive element and engages in a clamping nut that is produced separately from the side cover and is connected to this side cover in a non-detachable way.

From DE 197 08 661 B4, a device with two side covers and a drive element is known, wherein the side covers are attached by means of screws to the drive element. Here, each screw penetrates both side covers and the drive element, with a screw head contacting one side cover. In addition, each of the screws engages in a clamping nut that contacts an axial side surface of the other side cover. From DE 10 2005 024 241 A1, another device is known whose side cover has thread carriers formed integrally with the side cover and these thread carriers project in the axial direction past a disk-shaped section of the side cover.

SUMMARY

The present invention is based on the objective of providing a reliable device with low complexity in production and low production costs.

This objective is met according to the invention in that a separate spacing element is arranged between the spring element and the disk-shaped section of the side cover and this spacing element prevents an insertion of the spring element into the region between the fastening elements.

The device has a drive element and a driven element, wherein the drive element is driven by a crankshaft of the internal combustion engine and the driven element drives a camshaft of the internal combustion engine. The drive element can be in driven connection with the crankshaft, for example, by means of a traction mechanism or gear train. The driven element can be locked in rotation, for example, with the camshaft. In addition, an actuator, for example, a hydraulic actuator with at least two pressure chambers acting opposite each other, is provided, by means of which the driven element can be pivoted relative to the drive element in a defined range of angles. Thus, a phase relationship between the driven element and the drive element can be adjusted variably. On an axial side surface of the drive element and/or of the driven element there is a side cover that is locked in rotation with one of these components. Here, the side cover has a disk-shaped section, optionally with a central opening that seals the pressure chambers, for example, in an axial direction. In addition, fastening elements project in the axial direction from the side surface of the side cover facing away from the driven element or the drive element. Here, these fastening elements could be, for example, screw heads of screws or clamping nuts in which the screws engage. Through the use of the fastening elements, the connection between the side cover and the driven element or the drive element can be produced. In the case of clamping nuts, these can be connected rigidly to the disk-shaped section before assembly of the side cover or these can be separate components. Also conceivable are embodiments in which the fastening elements are formed integrally with the disk-shaped section, for example, as cylindrical collars that are provided with an internal thread.

A spring element that is formed, for example, as a helical spring, in particular, as a spiral spring, is mounted in front of the fastening elements and contacts, on one side, the driven element and, on the other side, the drive element. By means of the spring element, the driven element is loaded relative to the drive element with a torque that can be used, for example, for compensating friction losses or for reaching a base position in the case of insufficient loading of pressurized medium.

If the spring element is excited into axial oscillations while the internal combustion engine is operating, then there is the risk that the spring element or a winding of the spring element will be inserted into the region between the fastening elements or will become stuck there, with the result that the function of the spring element no longer has an effect or the spring element is damaged. To prevent this, a spacing element is provided that is produced separately from the side cover and is arranged between the spring element and the disk-shaped section of the side cover. Here, the spacing element is formed and arranged such that it prevents the spring element from entering into the region between the fastening elements. For example, the spacing element could be made from plastic and could be arranged, for example, between at least two fastening elements. In this way, the spacing element can extend, for example, in the peripheral direction of the disk-shaped section of the side cover.

If the spring element is excited into axial oscillations, then it contacts the spacing element, with the result that the oscillation amplitudes are reduced. Thus, the oscillation loads acting on the spring element decrease. In addition, the oscillations are damped.

Advantageously, the fastening of the spacing element on the side cover can be realized by means of a clamp connection between at least two fastening elements. This can be realized, for example, such that the spacing element has an elastically deformable construction and has recesses that are adapted to the fastening elements. Thus, no additional fastening structures need to be formed on the side cover.

In one concrete example of the invention, it is proposed that the spacing element projects past the fastening elements in the axial direction at least in some regions or ends flush with these fastening elements. This arrangement prevents the spring element from contacting the fastening elements, with the result that wear is reduced. In a concrete example of the invention, the spacing element has a base body and ribs projecting from the base body, wherein ribs project past the fastening elements in the axial direction at least in some regions or end flush with these fastening elements. Through this construction, first, the flexibility of the spacing element is increased, with the result that assembly is simplified and the clamping force is increased. Second, the use of materials in the production of the spacing element is decreased.

BRIEF DESCRIPTION OF THE DRAWINGS

Additional features of the invention are taken from the following description and from the drawings in which an embodiment of the invention is shown in simplified form. Shown are.

DETAILED DESCRIPTION OF THE PREFERRED EMBODIMENTS

Figure 1:
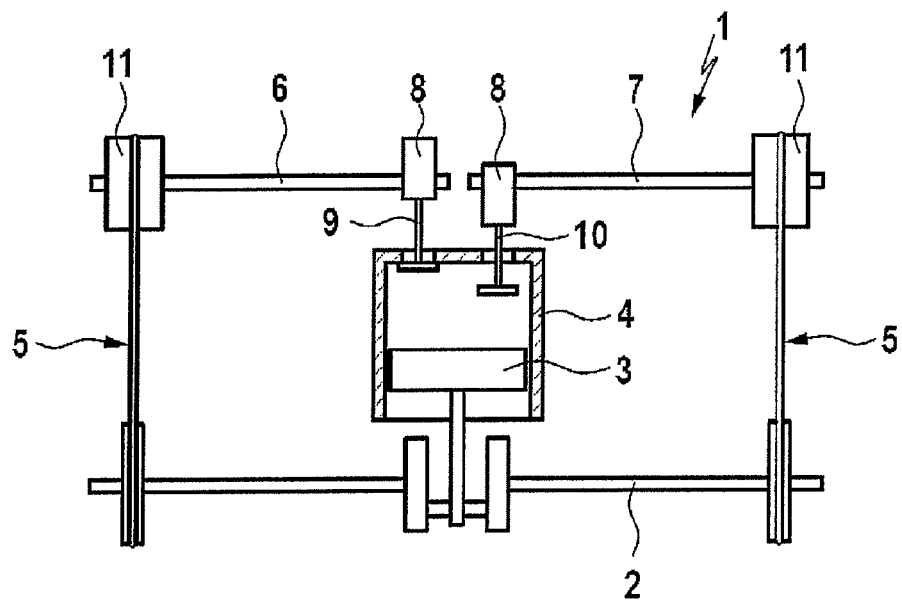
FIG. 1 an internal combustion engine only very schematically.

In FIG. 1, an internal combustion engine 1 is sketched schematically, wherein a piston 3 connected to a crankshaft 2 is shown in a cylinder 4. The crankshaft 2 is connected in the illustrated embodiment to an intake camshaft 6 and to an exhaust camshaft 7 by means of a corresponding traction mechanism drive 5, wherein a first and a second device 11 for variably adjusting the control times of gas-exchange valves 9, 10 can provide for a relative rotation between the crankshaft 2 and the camshafts 6, 7. Cams 8 of the camshafts 6, 7 activate one or more intake gas-exchange valves 9 and one or more exhaust gas-exchange valves 10, respectively.

Figure 2:
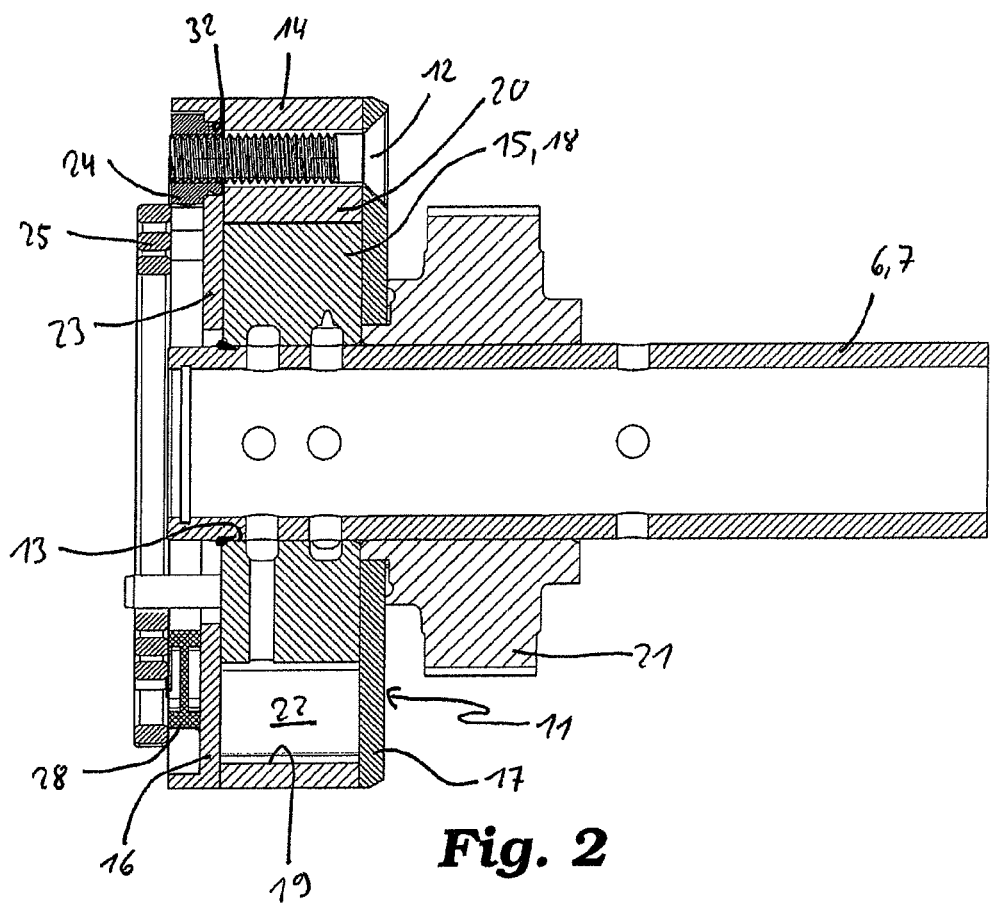
FIG. 2 a longitudinal section through a device according to the invention for variably adjusting the control times of gas-exchange valves of an internal combustion engine, FIG. 3 a plan view of the device from FIG. 2, FIG. 4 a perspective partial view of the device, wherein only the side cover is shown.

FIG. 2 shows a device 11 according to the invention in longitudinal section. Such devices 11 are known, for example, from DE 10 2008 017 688 A1. The device 11 has a drive element 14, a driven element 15, and two side covers 16, 17 that are arranged on axial side surfaces of the drive element 14 and are attached to this drive element by means of screws 12. The driven element 15 can be constructed, for example, in the form of an impeller and has an essentially cylindrical hub element 18 with vanes extending outward in the radial direction from the outer cylindrical lateral surface of this hub element.

Starting from an outer peripheral wall 19 of the drive element 14, projections 20 extend inward in the radial direction. In the illustrated embodiment, the projections 20 are formed integrally with the peripheral wall 19. The drive element 14 is mounted on the driven element so that it can rotate relative to this driven element 15 by means of peripheral walls of the projections 20 on the inside in the radial direction.

A chain wheel 21 is mounted in front of the drive element 14 and the second side cover 17. This chain wheel is locked in rotation with the second side cover 17 and torque can be transmitted via this chain wheel by means of a not illustrated chain drive from the crankshaft 2 to the drive element 14. The driven element 15 has a central opening 13 that is penetrated by the camshaft 6, 7. Here, the driven element 15 is locked in rotation with the camshaft 6, 7 by means of a weld connection.

Within the device 11, a pressure chamber 22 is formed between every two adjacent projections 20 in the peripheral direction. Each of the pressure spaces 22 is delimited in the peripheral direction by adjacent projections 20, in the axial direction by the side covers 16, 17, on the inside in the radial direction by the hub element 18, and on the outside in the radial direction by the peripheral wall 19. A vane projects into each of the pressure spaces 22, wherein the vanes contact both on the side covers 16, 17 and also on the peripheral wall 19. Each vane thus divides the corresponding pressure chamber 22 into two pressure chambers acting opposite each other.

By pressurizing one group of pressure chambers and depressurizing the other group, the phase position of the drive element 14 relative to the driven element 15 and thus the phase position of the camshaft 6, 7 relative to the crankshaft 2 can be varied. By pressurizing both groups of pressure chambers, the phase position can be held constant.

The first side cover 16 has a disk-shaped section 23 and four fastening elements 24. The fastening elements 24 are constructed in the form of clamping nuts that are attached with a positive fit in openings 32 of the disk-shaped section 23. Here, the clamping nuts 24 extend in the axial direction from the side surface of the disk-shaped section 23 facing away from the drive element 14. The clamping nuts 24 are each provided with an internal thread in which the screws 12 engage such that the rotationally fixed connection between the side covers 16, 17 and the drive element 14 is established. Here, two of the four screws 12 project in the axial direction out from the corresponding clamping nut 24. The length of the other screws 12 is selected such that these do not project from the clamping nuts 24 in the assembled state.

Figure 3:
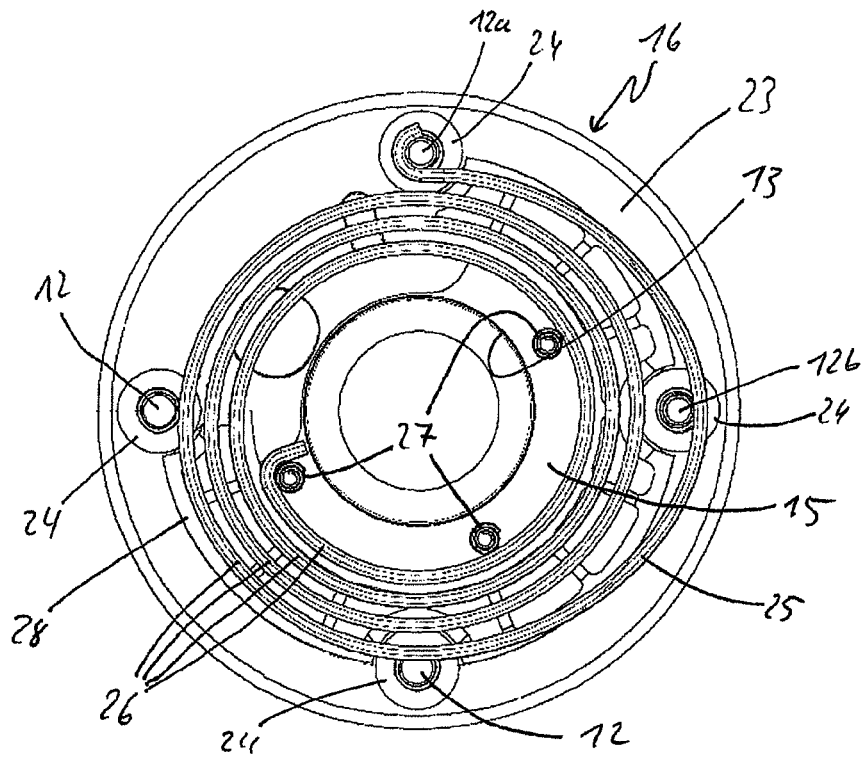
Figure 4:
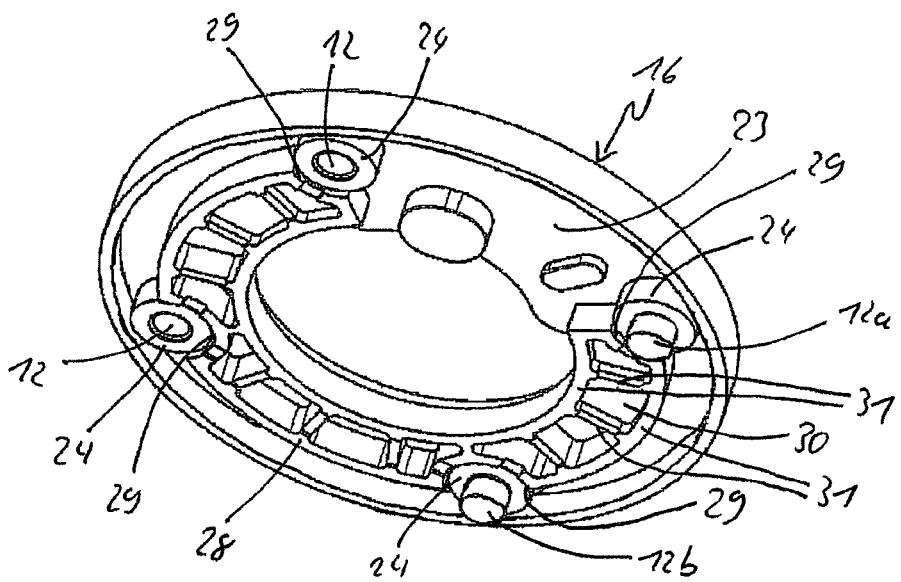

Mounted in front of the clamping nuts 24, a biased spring element 25 is provided in the form of a spiral spring. The spiral spring has multiple concentric spring windings 26 of different diameters. Here, one end of the outermost spring winding 26 engages the region of the first screw 12a projecting out from the clamping nut 24 (FIG. 3). In its further extent, the outermost spring winding 26 is supported in the radial direction by the region of the second screw 12b projecting out from the clamping nut 24. One end of the innermost spring winding 26 engages a pin 27 projecting out from the driven element 15. Simultaneously, the innermost spring winding 26 is supported on the inside in the radial direction on two additional pins 27 projecting out from the driven element 15. Thus, the biased spring element 25 is connected both to the drive element 14 and also to the driven element 15 such that a torque is imparted between these components. This arrangement can be used, for example, for moving the driven element 15 into a base position in the event of insufficient supply of pressurized medium to the device 11 or to balance out different displacement speeds in the direction of more advanced or more retarded control times of the gas-exchange valves 9, 10.

While the internal combustion engine 1 is operating, the spring element 25 is excited into axial and radial oscillations, with the result that individual spring windings 26 can become inserted into the region between the fastening elements 24. In addition to increasing the friction, there is the risk that the inserted spring winding 26 will become stuck between the fastening elements 24, with the result that the function of the device 11 is limited. This also results in increased wear on the spring element 25 and it raises the risk that the spring element 25 breaks due to the increased load.

To prevent these results, a spacing element 28 (also known as a spacer) is provided that is arranged in the region between the clamping nuts 24. The spacing element 28 has an essentially ring-shaped construction, wherein recesses 29 are provided that are adapted to the outer form of the clamping nuts 24. The spacing element 28 is produced from a flexible plastic, so that this can be placed with biasing between the clamping nuts 24 and can be clamped with these nuts. Thus, the spacing element 28 is connected in a captive way but nevertheless can be disassembled with the first side cover 16 in a non-destructive manner.

The spacing element 28 has a base body 30 of lower axial extent and multiple ribs 31 extending in the radial or peripheral direction, wherein the ribs 31 project past the open ends of the clamping nuts 24 in the axial direction. Through such a construction of the spacing element 28, first, the use of materials is kept low. In addition, the spacing element 28 obtains the elasticity needed for its assembly.

If the spring windings 26 of the spring element 25 are excited into axial oscillations while the internal combustion engine 1 is operating, the spacing element 28 prevents the spring windings 26 from entering into the region between the clamping nuts 24. In addition, the oscillation amplitude is reduced and the oscillation is damped. Thus, damage to the spring element 25 is prevented and the loading caused by the oscillations is reduced. The plastic of the spacing element 28 can be mixed, for minimizing friction, with friction-lowering particles, for example, Teflon particles. Additionally or alternatively, fiber-reinforced plastics could be used.

REFERENCE SYMBOLS

1 Internal combustion engine
2 Crankshaft
3 Piston
4 Cylinder
5 Traction mechanism drive
6 Intake camshaft
7 Exhaust camshaft
8 Cam
9 Intake gas-exchange valve
10 Exhaust gas-exchange valve
11 Device
12 Screw
13 Central opening
14 Drive element
15 Driven element
16 Side cover
17 Side cover
18 Hub element
19 Peripheral wall
20 Projection
21 Chain wheel
22 Pressure space
23 Disk-shaped section
24 Fastening element
25 Spring element
26 Spring winding
27 Pin
28 Spacing element
29 Recess
30 Base body
31 Rib
32 Openings

The invention claimed is:

1. A device for variably adjusting control times of gas-exchange valves of an internal combustion engine comprising:
   a drive element,
   a driven element, and
   at least one side cover,
   wherein the drive element can be brought into driven connection with a crankshaft of the internal combustion engine,
   wherein the driven element can be brought into driving connection with a camshaft of the internal combustion engine and is arranged pivotable relative to the drive element,
   wherein the side cover is arranged on an axial side surface of the driven element or of the drive element and is locked in rotation with the drive element or the driven element,
   a spring element is arranged on a side of the side cover facing away from the drive element and the driven element, and
   the side cover has a disk-shaped section from which multiple fastening elements project in an axial direction, with the fastening elements being arranged on the side of the side cover facing away from the drive element,
   a separate spacing element is arranged between the spring element and the disk-shaped section of the side cover, the spacing element prevents an insertion of the spring element into a region between the fastening elements, and
   a releasable fastening of the spacing element on the side cover is realized by a clamp connection resulting from radial elastic deformation of the spacing element between at least two of the fastening elements.

2. The device according to claim 1, wherein the spacing element is arranged between at least two of the fastening elements.

3. The device according to claim 1, wherein the spacing element extends in a circumferential direction of the disk-shaped section of the side cover.

4. The device according to claim 1, wherein the spacing element projects past the fastening elements in an axial direction at least in some regions or ends flush with the fastening elements.

5. The device according to claim 4, wherein the spacing element has a base body and ribs projecting from the base body, and the ribs project past the fastening elements in the axial direction at least in some regions or end flush with the fastening elements.

6. The device according to claim 1, wherein the spacing element is made from a plastic.

* * * * *